United States Patent [19]

Havalda

[11] 4,073,065
[45] Feb. 14, 1978

[54] METHOD AND APPARATUS FOR REDUCING LIQUID CONTENT OF FILTER CAKES

[75] Inventor: Paul Havalda, Arlesheim, Switzerland

[73] Assignee: Ciba-Geigy Corporation, Ardsley, N.Y.

[21] Appl. No.: 693,393

[22] Filed: June 7, 1976

[30] Foreign Application Priority Data

June 10, 1975 Switzerland .......................... 7475/75
May 6, 1976 Switzerland .......................... 5690/76

[51] Int. Cl.² ............................................ F26B 19/00
[52] U.S. Cl. ........................................ 34/71; 34/15; 159/8
[58] Field of Search ................... 34/15, 17, 69, 70, 71; 159/8

[56] References Cited

U.S. PATENT DOCUMENTS

3,421,211  1/1969  Eaves et al. ............................ 34/17

FOREIGN PATENT DOCUMENTS

1,587,881  2/1970  France .................................... 34/17
2,219,836  2/1974  France.
430,559  6/1935  United Kingdom.

*Primary Examiner*—John J. Camby
*Attorney, Agent, or Firm*—Harry Falber

[57] ABSTRACT

A method and apparatus for reducing the liquid content of a layer of material formed on a belt filter where a differential gas pressure is produced across the layer of material with a maximum pressure at the exposed surface thereof and a minimum pressure at the filter belt and the layer of material is mechanically compressed against the filter by a gas permeable pressure surface.

11 Claims, 5 Drawing Figures

4,073,065

METHOD AND APPARATUS FOR REDUCING LIQUID CONTENT OF FILTER CAKES

BACKGROUND TO THE INVENTION

1. Field of the Invention

This invention relates to a method and apparatus for reducing the liquid content of a layer of material formed on a filter.

2. Prior Art

Frequently, filter cakes, that is, a layer of material formed on a filter during filtration, more particularly layers of solid particles formed by extraction of a liquid from a suspension of the solid particles in the liquid, have to be further dried because the residual liquid content is excessive. For example, when certain products, more particularly dyes, are filtered on continuously operating vacuum filters, the filter cakes have an undesirably high residual moisture content (approx. 70 – 85%). This is due mainly to cracks forming during suction-drying and resulting in non-uniform suction.

In the prior art, the filter cake is subsequently mechanically dried in special devices remote from the filter press. This results in relatively high capital expense and a large amount of space is required.

OBJECT OF THE INVENTION

An object of the invention is to provide a method and device for improving the drying operation at the filter whereby there is a reduced need for subsequent drying.

BRIEF REVIEW OF THE INVENTION

The invention relates to a method of reducing the residual liquid content in layers of material formed on filters, more particularly belt filters, in which the filter and the layer of material formed thereon move through a drying region in which the layer of material is subjected to a differential gas pressure having a gradient with a maximum at the layer of material and a minimum at the filter. To this end, according to the invention, the layer of material on the filter, during its travel through the drying region, is mechanically compressed over a substantial part of its area, while simultaneously allowing access for said gas to a major part of the surface of the layer.

The mechanical compression of the filter cake prevents cracking and reduces the volume of cavities and the porosity and pore size of the layer to be dried. Most of the liquid is driven from the layer by said mechanical compression. Since gas is allowed access to the surface of the layer, suction can continue during the mechanical compression. In addition, the mechanical compression provides optimum conditions for suction, since bulk flow can develop in the layer, which is free from cracks and has relatively small cells or pores. During the process of sucking out the pores, the gas speed increases whereupon the gas also removes, partly by evaporation, most of the film of liquid clinging by capillary action to the cell walls.

DESCRIPTION OF THE PREFERRED EMBODIMENTS

Figure 1:
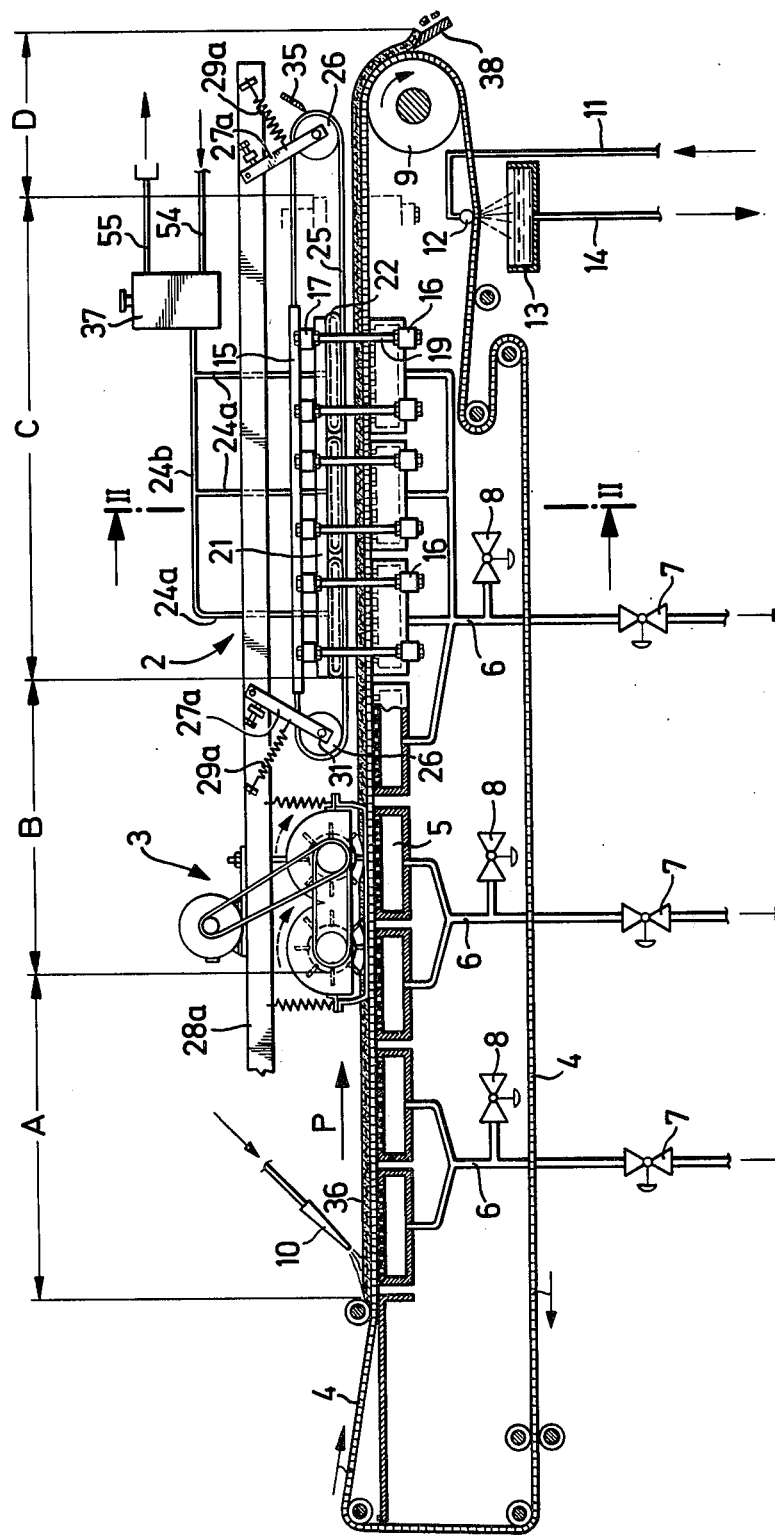
FIG. 1 is a block diagram of a vacuum belt filtration plant adapted in accordance with the invention.
Figure 2:
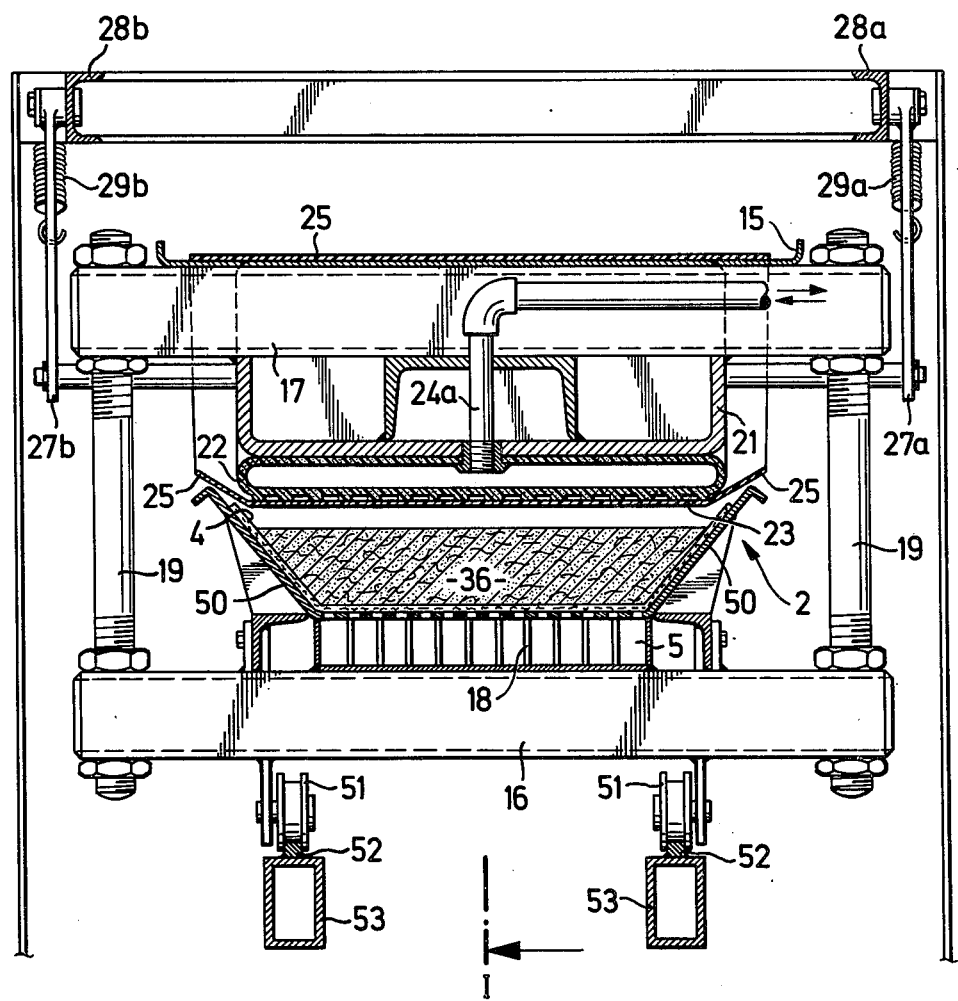
FIG. 2 shows an enlarged detail in section along line I—I of FIG. 1.

FIGS. 1 and 2 show a vacuum belt filtration plant, as described, e.g., in Swiss Pat. Spec. No. 385 702, in conjunction with a press facility 2 constructed according to the invention and a liquid treatment facility 3. The filtration plant comprises a filter belt 4 running through a separation region A, a liquid treatment region B, a drying region C and a discharge region D in the direction of arrow P. Vacuum chambers 5 are disposed under the belt and can be connected as required via flexible pipes 6 and valves 7 to a common suction device (not shown) or connected to a gas source to destroy the vacuum via valves 8. Filter belt 4 can be continuously and adjustably driven by a roller 9 in the direction of arrow P. The suspension of solid particles in a liquid is supplied by a device 10. After the filter belt has moved past roller 9, it is conveyed through a cleaning facility comprising a feed pipe 11, a nozzle 12, a storage tank 13 and a discharge pipe 14.

The belt 4 moves in a trough 50 which has a trapezoidal cross section and a perforated bottom formed by the upper surface of the vacuum chambers 5, the sides of the trough being formed by outwardly flared extensions of the upper walls of the vacuum chambers 5 which are reinforced by webs 18. The vacuum chambers 5 can move on rollers 51 running on rails 52 secured to girders 53 of the machine frame. A press bearing the general reference 2 is also secured to three of the vacuum chambers. The press comprises a frame enclosing a portion of the trough 50, upper and lower girders 16, 17 respectively and adjusting bolts 19 connecting the girders. At least one group of girders (the lower in the drawing) is permanently secured to the three vacuum chambers. A plate-shaped element 21 projecting towards the trough 50 is secured to the underside of girder 17 and bears pressure cushions 22. The pressure cushions can be connected via lines 24a, 24b and a control system 37 (valves, etc.) via a line 54 to a pressure source (not shown) or can be connected via a line 55 to a suction source (not shown). The pressure-medium system can additionally or alternatively be vented to release the pressure.

An "endless" belt 25 made of material permeable to air or other gas runs between pressure-cushions 22 and the filter belt 4 or a filter cake 36 deposited thereon. Belt 25 is guided over two free-running rollers 26, each secured by a pair of levers 27a, 27b to a pair of top girders 28a, 28b of the machine frame. Lever pairs 27a, 27b are loaded by tension springs 29a, 29b and act as a belt-tensioning means. The top run of belt 25 is guided in a channel 15 secured to the upper girder 17. Belt 25 moves through a cleaning facility, which in the embodiment shown is a scraper 35.

The facility for treating the filter cake with liquids, which bears the general reference 3 and is connected upstream of press 2 in the direction of motion of belt 4, is the subject of copending U.S. patent application Ser. No. 672,915 dated Apr. 2, 1976, where it is described in detail.

Figure 3:
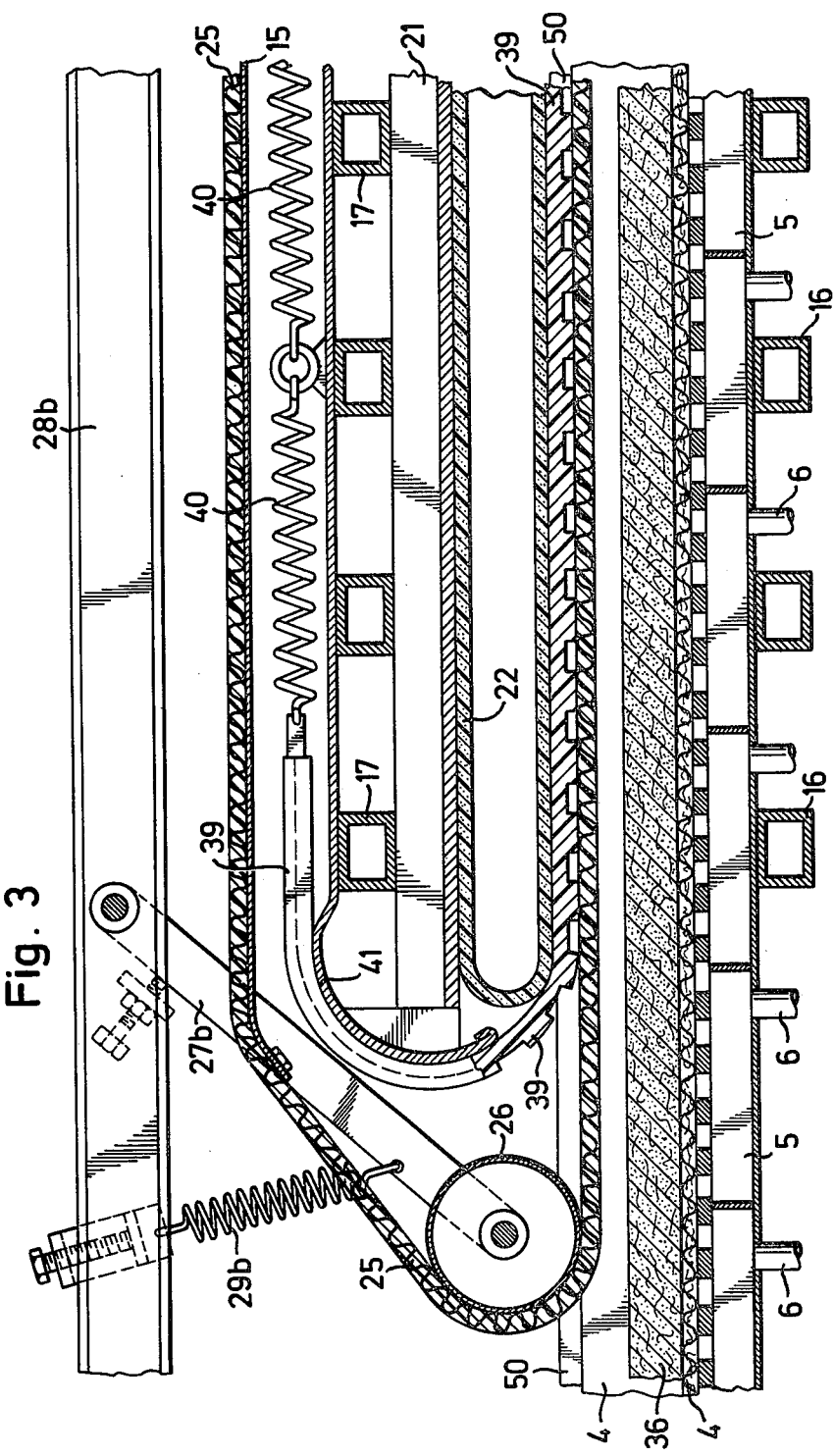
FIG. 3 is a detail variant of region C of FIG. 1 in section approximately through the middle of a filter belt 4 parallel to the plane of the drawing.

The special feature of the variant in FIG. 3 is that the pressure cushion or cushions are protected from the filter belt or filter cake by an anti-corrosion belt 39.

Either a separate belt 39 can be provided for each cushion, or a common belt can be provided for a number of cushions, more particularly for all of them. Belt 39 is guided over surfaces 41 and tension by springs 40. The belt has a surface facing the filter cake 36 or gas-permeable belt 25 having projections thereon whereby channels are formed for passage of air or other gas to the filter cake 36 or gas-permeable belt 25. The depth or height of the channels is about 2 to 10 mm., perferably 3 to 5 mm. In this embodiment, the surface of the or each pressure cushion 22 is substantially flat.

The main advantage of the variant in FIG. 3 is that the material of the pressure cushion or cushions 22 need be chosen to fulfill only the elasticity requirements, and more particularly that commercial pressure cushions can be used without regard to their resistance to corrosion. Any corrosion problems can normally be solved in optimum manner by a suitable choice of the protective-belt material without special regard for its elasticity. The pressure cushions can be made of rubber-like material and the protective belt can be made of hard resilient material.

By way of example, nylon fabric coated on both sides with synthetic rubber has been found suitable as a material for the pressure cushion. Suitable pressure cushions of this kind are commercially available, inter alia under the trade name Pronal. Plastics, more particularly propylene, polyester or polyamide, has been found suitable as a material for the air-permeable belt 25. The protective belt 39 is preferably made of polytetrafluoroethylene or the like. The pressure cushions are secured at the center of their upper surface only, by means of the end socket of suction pipe 24a. The surfaces of the pressure cushions and belt 25 (FIGS. 1, 2) or 39 (FIG. 3) in contact therewith are made of materials or have surface properties which allow one to slide over another at least to a limited extent to reduce or remove wrinkles.

Pressure cushions 22, in combination with the gas-permeable belt 25, form a gas-permeable pressing surface. The vacuum in the vacuum chambers 5 sucks the air or other gaseous drying agent through the channels in the end faces of the pressure cushions (FIG. 2) or of the protective belt 39 (FIG. 3) and through the gas-permeable belt 25, the filter cake 36 and the preforated upper surface chambers 5. In the embodiment shown, atmospheric air is sucked through. If required, atmospheric air can be replaced by processed air, more particularly dried and/or heated air. In addition, at least one gas facilitating the drying process for example $CO_2$ and/or $N_2$, can be added to the air or the air can be replaced by such gases or mixtures thereof. The gases can also be selected so that they react chemically with the filter-cake material.

The drawings do not show the means for processing the air and supplying the processed air and/or gas. The supply means must be substantially of such a nature that the processed air or gas or gas mixture is supplied to the lateral edges of the pressure cushions and flows as uniformly as possible over their entire length.

Of course, without departing from the invention, belt 25 can have an inner surface having channel forming projections thereon in which case use can be made of commercial pressure cushions 22 having a smooth surface and smooth protective belt 39.

OPERATION

At region A, a suspension for filtering is deposited by a device 10 on to filter belt 4, where it subsequently forms a filter cake 36. The cake moves in the direction of arrow P, and has a thickness which can be adjusted by proportioning the amount of suspension and varying the speed of the filter belt. The cake forming in region A comes into the operating region of the liquid treatment facility 3 at region B, and is there slurried and extracted or washed. After passing device 3, the suspension is again deposited in the form of a cake on the still-moving filter belt 4. In region C, the treated cake is mechanically compressed by press 2. Air and/or a drying gas is conveyed through the compressed cake. In region C, the filter belt is discharged by a lifting device 38.

The movement is controlled so that vacuum chambers 5 and consequently press 2 move in synchronism with belt 4, when the chambers are under vacuum (valves 7 open and valves 8 closed). During the entire synchronous phase, pressure cushions 22 are connected via 24a, 24b, 37 and 54 to the pressure source (not shown) and inflated, so that they compress the filter cake and thus clamp a run of belt 25 between the filter cake and the pressure cushions, so that belt 25 moves along at the same speed and is continuously cleaned by scraper 35.

When the assembly of the three chambers (5,51) running on rails 52 reaches the end of its travel with the filter belt (the right end position in FIG. 1), the vacuum chambers 5 are simultaneously opened to the atmosphere (valves 7 closed and valves 8 opened) and pressure cushions 22 are deflated or put under negative pressure (via line 55, FIG. 1). Immediately afterwards, the assembly of three chambers is moved in the opposite direction to the filter belt into its starting position for a new cycle.

The assembly running on rails 52 can run freely in the same direction as the filter belt and be entrained thereby (by the suction effect) or can be driven by a motor (not shown) in synchronism with the filter belt. In the last-mentioned embodiment, the assembly is coupled to a resetting mechanism. In the second embodiment, the motor drive is reversible. A suitable drive for the assembly and for the control facility required for the aforementioned sequence of operations and movements is described, e.g., in German Offenlegungsschrift No. 2,343,848.

FURTHER MODIFICATIONS

Figure 4:
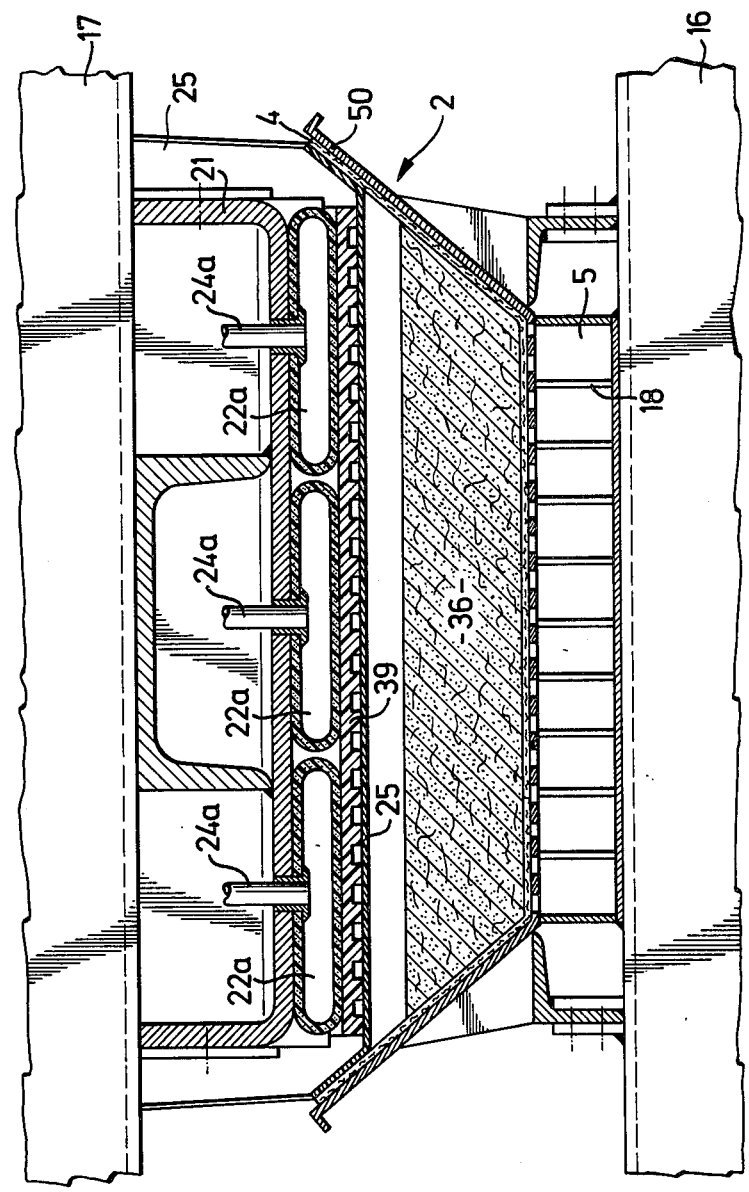
FIG. 4 is another detail variant in a cross-section corresponding to FIG. 2.

FIG. 4 shows another variant of a device according to the invention. The only essential difference between this variant and the preceding one is that the single pressure cushion is replaced by three adjacent cushions 22a at right angles to the direction of motion of the filter. This embodiment may be advantageous, particularly for relatively wide filter belts.

Figure 5:
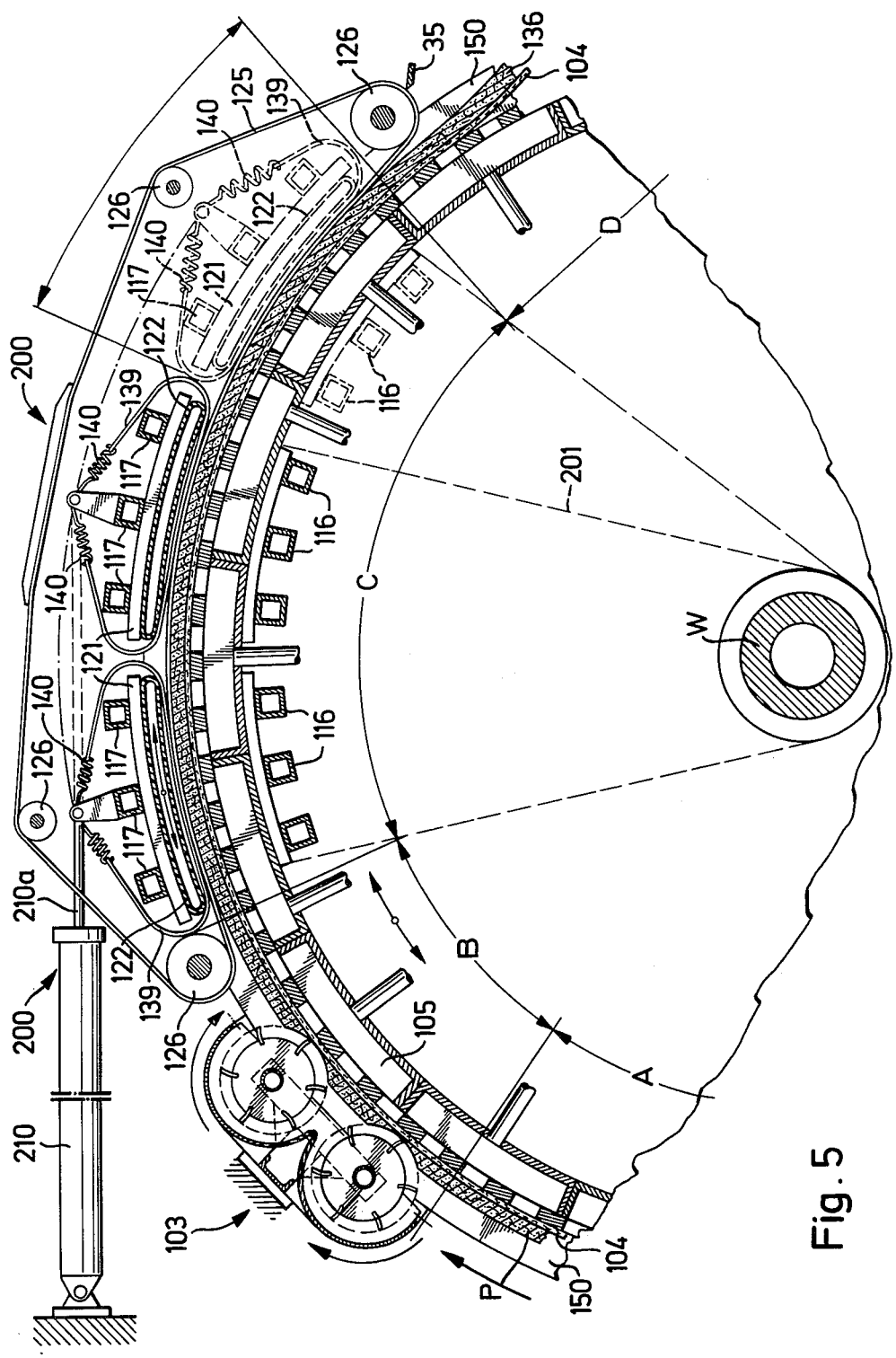
FIG. 5 shows part of a second vacuum belt filtration plant adapted in accordance with the invention.

FIG. 5 shows another variant, in conjunction with a known drum vacuum filter, in which the vacuum chambers 105 are not flat but part-cylindrical. As before, a filter belt 104 travels over them in a trough 150. In the same manner as in FIG. 1, the drum-filter periphery is divided into a separation region A, a liquid treatment region B, a drying region C and a discharge region D. The liquid treatment region B contains a liquid treatment facility 103 similar to that in FIG. 1.

In contrast to FIG. 1, not one but two presses 200 are disposed in the drying region. The presses do not run on rails, but their cross-beams 116 and 117 are secured to two plates 201 which can each pivot at one end face of the drum filter around the filter shaft W. Pressure plates 121 are not flat but have a curvature corresponding to that of the drum filter surface. In other respects, the presses have the same construction as in FIG. 3 and, more particularly, each comprises a pressure cushion 122 and a structured protective belt 139 tensioned by springs 140. As before, an endless belt 125 runs on rollers 126 between belt 139 and filter cake 136. The tensioning device for belt 125 is not shown.

Press 200 is moved through the drying region C by a pneumatic cylinder 210 having a piston rod 210a which engages in one of the lateral plates 201. The pneumatic cylinder control and the inflation and deflation of cushions 122 are exactly as in the previous example. More particularly, use may be made of the drive and control facility described in the aforementioned German Offenlegungsschrift No. 2,343,848.

What is claimed is:

1. Apparatus for reducing the liquid content in a layer of material formed on a filter comprising a mechanically driven belt filter, drying means comprising at least one vacuum chamber below the filter producing a differential gas pressure across the layer of material having a maximum pressure at the exposed surface of the layer of material and a minimum pressure at the filter, a press having a gas permeable pressure surface and means for forcing said pressure surface against the layer of material on the filter, means for moving the press backwards and forwards above the filter belt parallel to the direction of motion of the filter belt and control means controlling the press whereby in cyclic sequence,
    a. the pressure surface is forced against the layer of material on the filter belt,
    b. the pressure surface moves in synchronism with the belt for a predetermined distance from a starting position,
    c. the pressure surface is disengaged from the layer of material on the filter belt, and
    d. the pressure surface returns to said starting position.

2. Apparatus according to claim 1, where the pressure surface has projections thereon forming channels conveying said gas, the depth of said channels being between 2 and 10 mm, and a gas-permeable layer is provided between said pressure surface and said layer of material on the filter belt.

3. Apparatus according to claim 2, where the depth of said channels is between 3 and 5 mm.

4. Apparatus according to claim 2, where the pressure surface is formed from a corrosion resistant material.

5. Apparatus according to claim 4, where the corrosion resistant material is acid resistant.

6. Apparatus according to claim 4, where the pressure surface is a protective belt.

7. Apparatus according to claim 2, where the gas-permeable layer is an endless belt guided over rollers.

8. Apparatus according to claim 7, where the endless belt is conveyed through a belt cleaning means.

9. Apparatus according to claim 2, where the means for forcing said pressure surface against the layer of material on the filter belt comprises at least one substantially rectangular pressure cushion and means connecting said pressure cushion(s) to a pressure source.

10. Apparatus according to claim 9, with means for connecting the pressure cushion(s) to a negative pressure source.

11. Apparatus according to claim 1, with means for moving the at least one vacuum chamber below the filter belt backwards and forwards in a direction parallel to the motion of the filter belt and means for forming and destroying a vacuum in said at least one vacuum chamber and said control means controls said means for moving said at least one vacuum chamber and said means for forming and destroying a vacuum whereby
    a. a vacuum is formed in said at least one vacuum chamber,
    b. the said at least one vacuum chamber moves in synchronism with the filter belt and the press for a predetermined distance from a starting position,
    c. the vacuum is destroyed, and
    d. the said at least one vacuum chamber returns to said starting position.

* * * * *